United States Patent [19]

Takahashi et al.

[11] Patent Number: 5,347,372
[45] Date of Patent: Sep. 13, 1994

[54] IMAGE SCANNING AND PROCESSING APPARATUS WITH ERROR CHECKING

[75] Inventors: Hiroyuki Takahashi, Tsurugashima; Wataru Nara, Kawasaki; Yasushi Kamo, Tokyo; Toshiyuki Aihara, Kamakura; Seiji Tsuchiko, Sagamihara, all of Japan

[73] Assignee: Ricoh Company, Ltd., Tokyo, Japan

[21] Appl. No.: 156,851

[22] Filed: Nov. 24, 1993

[30] Foreign Application Priority Data

Nov. 27, 1992 [JP] Japan ............................... 4-318178

[51] Int. Cl.⁵ ............................................ H04N 1/00
[52] U.S. Cl. ............................... 358/471; 358/445; 358/446; 358/443
[58] Field of Search ............... 358/406, 445, 446, 443, 358/448, 461; 348/187, 181; H04N 1/04

[56] References Cited

U.S. PATENT DOCUMENTS

| | | | |
|---|---|---|---|
| 4,757,386 | 7/1988 | Sanner | 348/257 |
| 4,878,119 | 10/1989 | Beikirch et al. | 358/471 |
| 5,296,944 | 3/1994 | Suzuki et al. | 358/446 |

*Primary Examiner*—Edward L. Coles, Sr.
*Assistant Examiner*—Fan Lee
*Attorney, Agent, or Firm*—Oblon, Spivak, McClelland, Maier & Neustadt

[57] ABSTRACT

An image scanner for reading a document optically with a CCD image sensor or similar line image sensor, and electrically processing, e.g., amplifying and digitizing the resulting image signal. When an error occurs in the scanner, it can be located easily and rapidly.

3 Claims, 17 Drawing Sheets

OS1', OS2'

CLMP

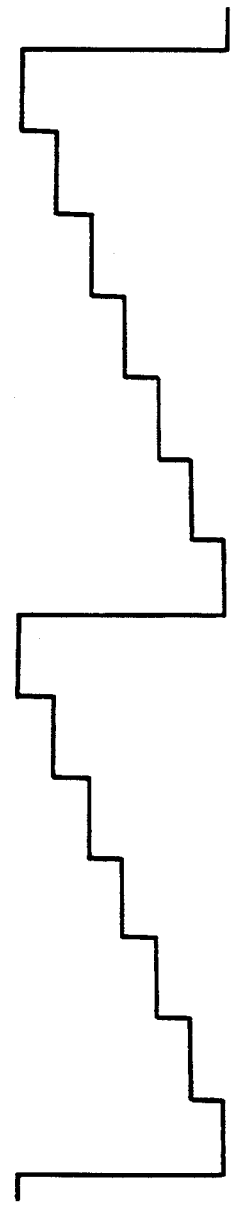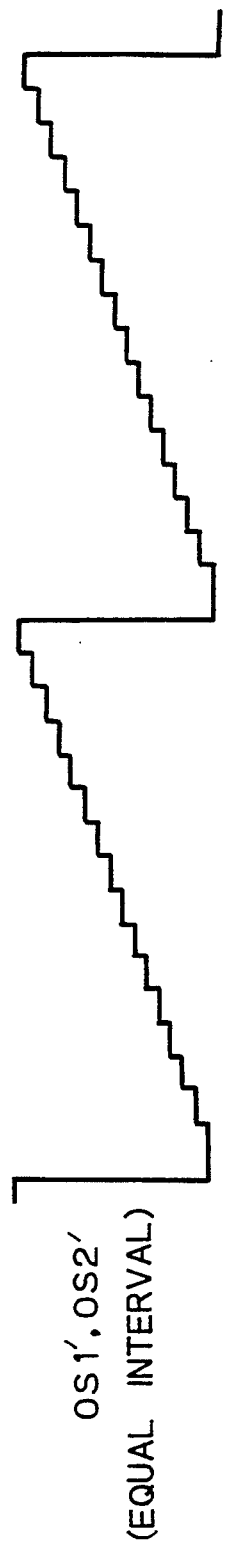
Fig. 8A  OS1', OS2'
Fig. 8B  CLMP
Fig. 8C  OS1', OS2' (EQUAL INTERVAL)

OS1', OS2'
(LOG INTERVAL)

Fig. 11

| ADDRESS | REFLECTION LINEAR (EQUAL INTERVAL) | | DENSITY | DENSITY LINEAR (LOG INTERVAL) | |
|---|---|---|---|---|---|
| | REFLECTANCE | DIGITAL VALUE | | REFLECTANCE | DIGITAL VALUE |
| 0 | 2.8% | 7 | 1.55 | 2.8% | 7 |
| 1 | 8.6 | 23 | 1.45 | 3.5 | 9 |
| 2 | 14.3 | 38 | 1.35 | 4.5 | 12 |
| 3 | 20.1 | 54 | 1.25 | 5.6 | 15 |
| 4 | 25.8 | 69 | 1.15 | 7.1 | 19 |
| 5 | 31.6 | 85 | 1.05 | 8.9 | 24 |
| 6 | 37.3 | 100 | 0.95 | 11.2 | 30 |
| 7 | 43.1 | 116 | 0.85 | 14.1 | 38 |
| 8 | 48.8 | 131 | 0.75 | 17.8 | 48 |
| 9 | 54.6 | 147 | 0.65 | 22.4 | 60 |
| 10 | 60.3 | 162 | 0.55 | 28.2 | 76 |
| 11 | 66.1 | 178 | 0.45 | 35.5 | 96 |
| 12 | 71.8 | 193 | 0.35 | 44.7 | 120 |
| 13 | 77.6 | 209 | 0.25 | 56.2 | 151 |
| 14 | 83.3 | 224 | 0.15 | 70.8 | 190 |
| 15 | 89.1 | 240 | 0.05 | 89.1 | 240 |

Fig.14A OS1′,OS2′ 
Fig.14B CLMP 
Fig.15A OS1′ 
Fig.15B OS2′ 

Fig.16A OS1′ 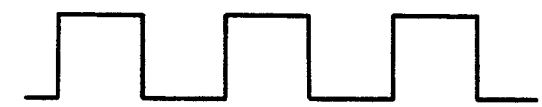
Fig.16B OS2′ 
Fig.16C S/H1 
Fig.16D S/H2 

IMAGE SCANNING AND PROCESSING APPARATUS WITH ERROR CHECKING

BACKGROUND OF THE INVENTION

The present invention relates to an image scanner for reading a document optically with a CCD (Charge Coupled Device) image sensor or similar line image sensor, and processing, e.g., amplifying and digitizing the resulting image signal electrically.

It is a common practice with an image scanner to construct a CCD circuit and an image signal processing circuit independently on separate circuit boards. However, the problem with this kind of arrangement is that when the output of the signal processing circuit is faulty, there is no implementation for determining which of the CCD circuit and image signal processing circuit has failed easily and rapidly, i.e., the two circuits have to be tested one by one. A digital copier, for example, is made up of a CCD circuit, a signal processing circuit, an image processing circuit (IPU), a write processing circuit, etc. Assume that a pattern generator is built in each of the signal processing circuit and write processing circuit. Then, the write processing circuit can be tested if the output of the pattern generator built therein is written and then printed. When the write processing circuit is not faulty as determined by the test, the signal processing circuit can be tested if the output of the pattern generator built therein is processed and then applied to the write processing circuit to be printed thereby. Hence, when the reproduction of a document is defective despite that the write processing circuit is normal, it can be determined that the scanner is faulty. However, which of the CCD circuit and signal processing circuit included in the scanner is faulty cannot be determined. As a result, a fault cannot be located without consuming a substantial period of time.

SUMMARY OF THE INVENTION

It is, therefore, an object of the present invention to provide an image scanner which allows a an error occurred therein to be located easily and rapidly.

An image scanner of the present invention comprises an image reading circuit for reading an image optically to thereby generate an odd order and an even order analog image signal representative of the image, and an image signal processing circuit for converting the odd order and even order image signals to digital image signals. The image signal processing circuit is made up of first amplifiers for amplifying respectively the odd order and even order analog image signals, sample and hold circuits for sampling and holding respectively the image signal portions of the odd order and even order analog image signals amplified by the amplifiers, clamp circuits for clamping respectively the black dummy portions of the odd order and even order analog image signals sampled and held by the sample and hold circuits, a multiplexer for multiplexing the odd order and even order analog image signals clamped by the clamp circuits, a second amplifier for amplifying the output of the multiplexer, an analog-to-digital converter for transforming the output of the multiplexer amplified by the second amplifier to a digital image signal, a false signal generator for generating a false reference signal, an input circuit for inputting a test command, and a signal switching circuit located on a signal path extending from the image reading circuit to the analog-to-digital converter for delivering, when a test command is entered on the input circuit, the false reference signal to a part of the signal path downstream of the signal switching circuit or delivering, when the test command is not entered, a signal appearing on the signal path upstream of the signal switching means to the signal path downstream of the signal switching circuit.

BRIEF DESCRIPTION OF THE DRAWINGS

The above and other objects, features and advantages of the present invention will become more apparent from the following detailed description taken with the accompanying drawings in which:

FIG. 8A shows the waveform of a false signal generated by the false signal generator of FIG. 7;

FIG. 8B shows the waveform of a clamp signal;

FIG. 8C shows a false signal having steps of equal interval;

FIG. 11 is a table listing data for determining the logarithmic interval of the false signal shown in FIG. 10;

FIG. 14A shows the waveform of a false signal which is the combination of a linearly increasing signal and any desired rectangular wave;

FIG. 14B shows the waveform of a clamp signal;

FIG. 15A shows a false signal having a saw-toothed waveform and input at the time of odd order;

FIG. 15B shows the waveform of a zero-volt false signal which is input at the time of even order;

FIG. 16A shows the waveform of a false signal approximated to the output waveform of a CCD image sensor included in the embodiment;

FIG. 16B shows the waveform of another false signal approximated to the output waveform of a CCD image sensor;

FIG. 16C shows the waveform of a signal input to a sample and hold circuit;

FIG. 16D shows the waveform of another signal input to the sample and hold circuit;

DESCRIPTION OF THE PREFERRED EMBODIMENT

Figure 17A:
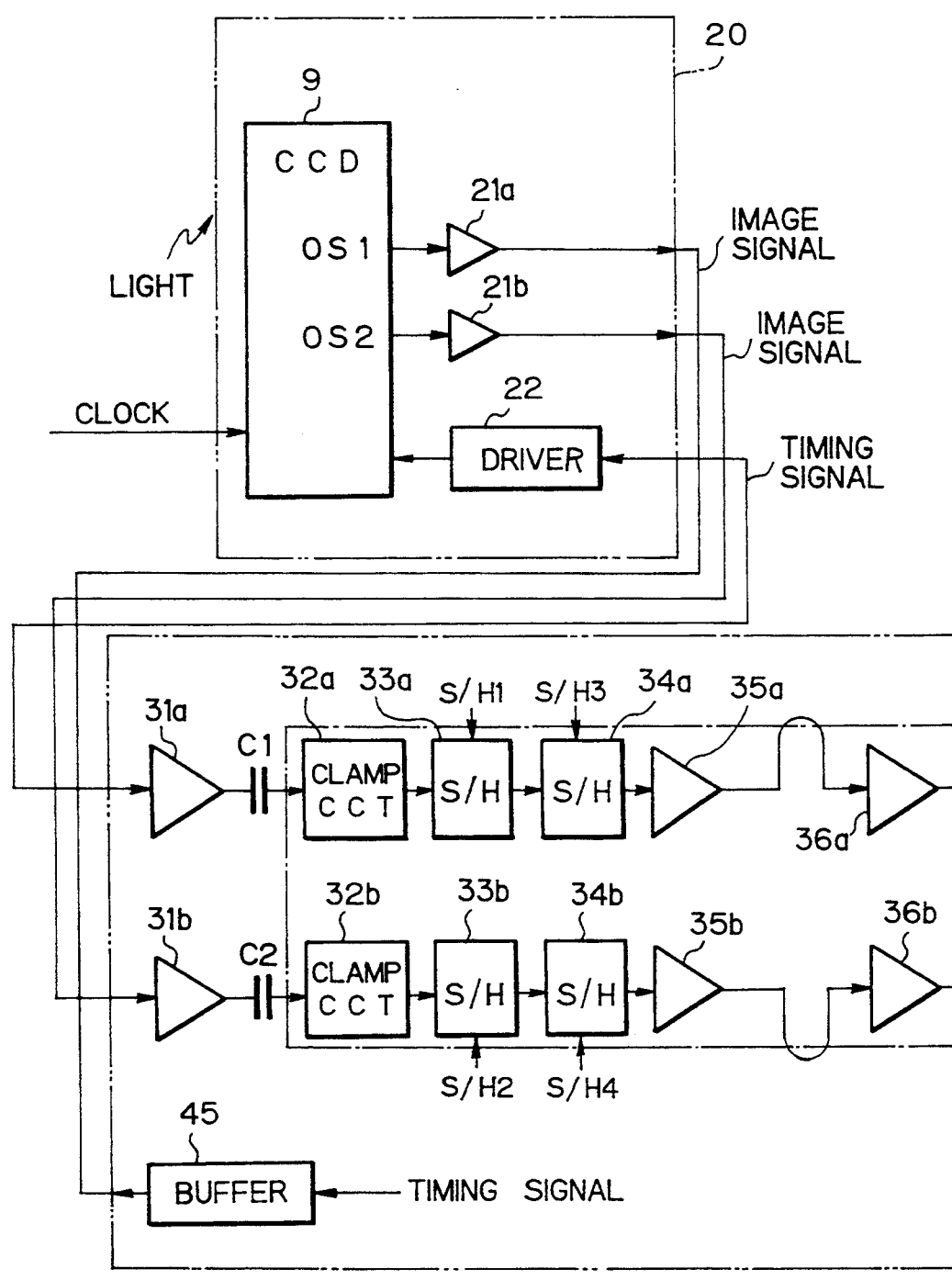
FIG. 17 is a block diagram schematically showing a conventional image scanner.
Figure 17B:
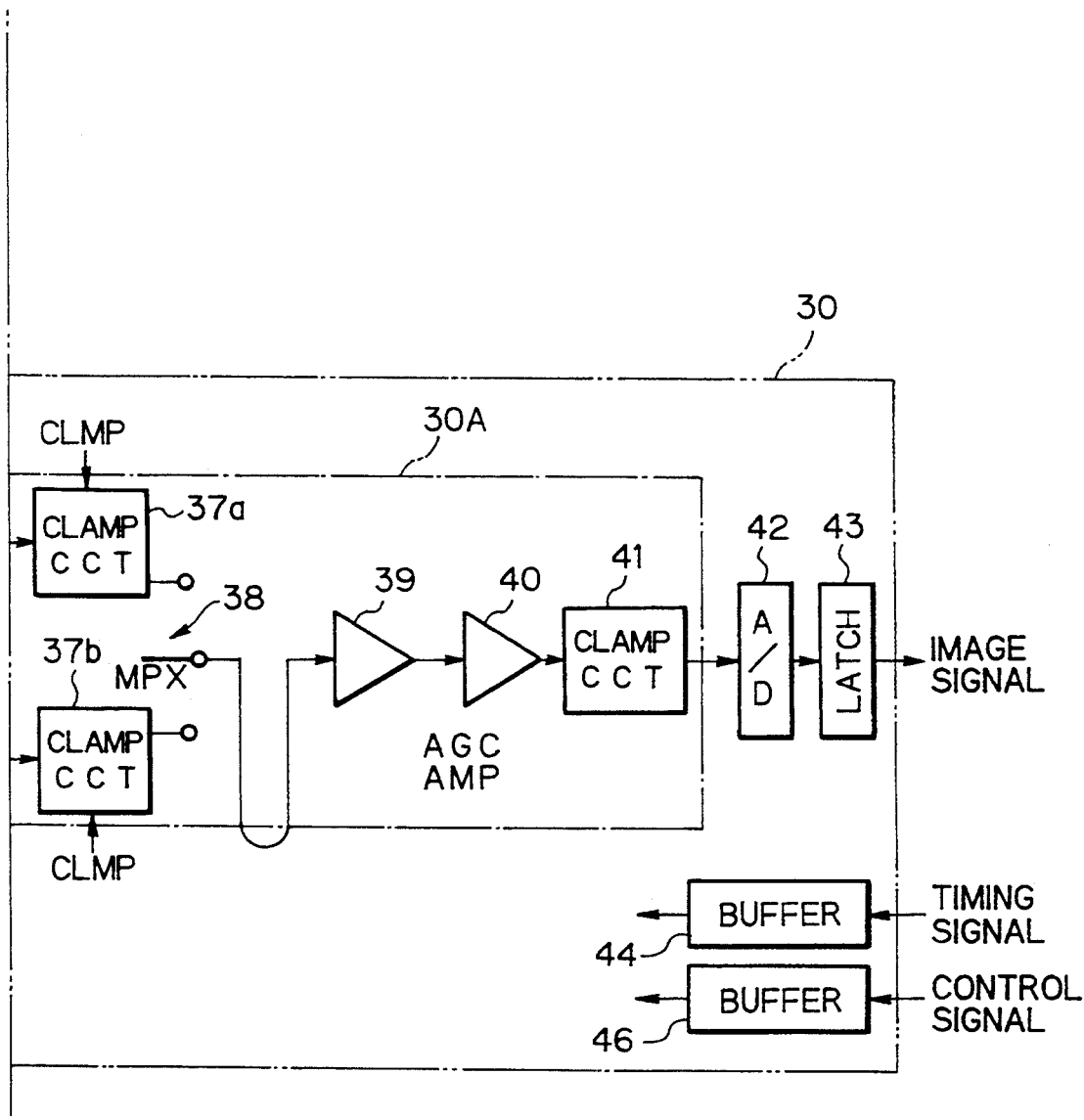
Figure 18:
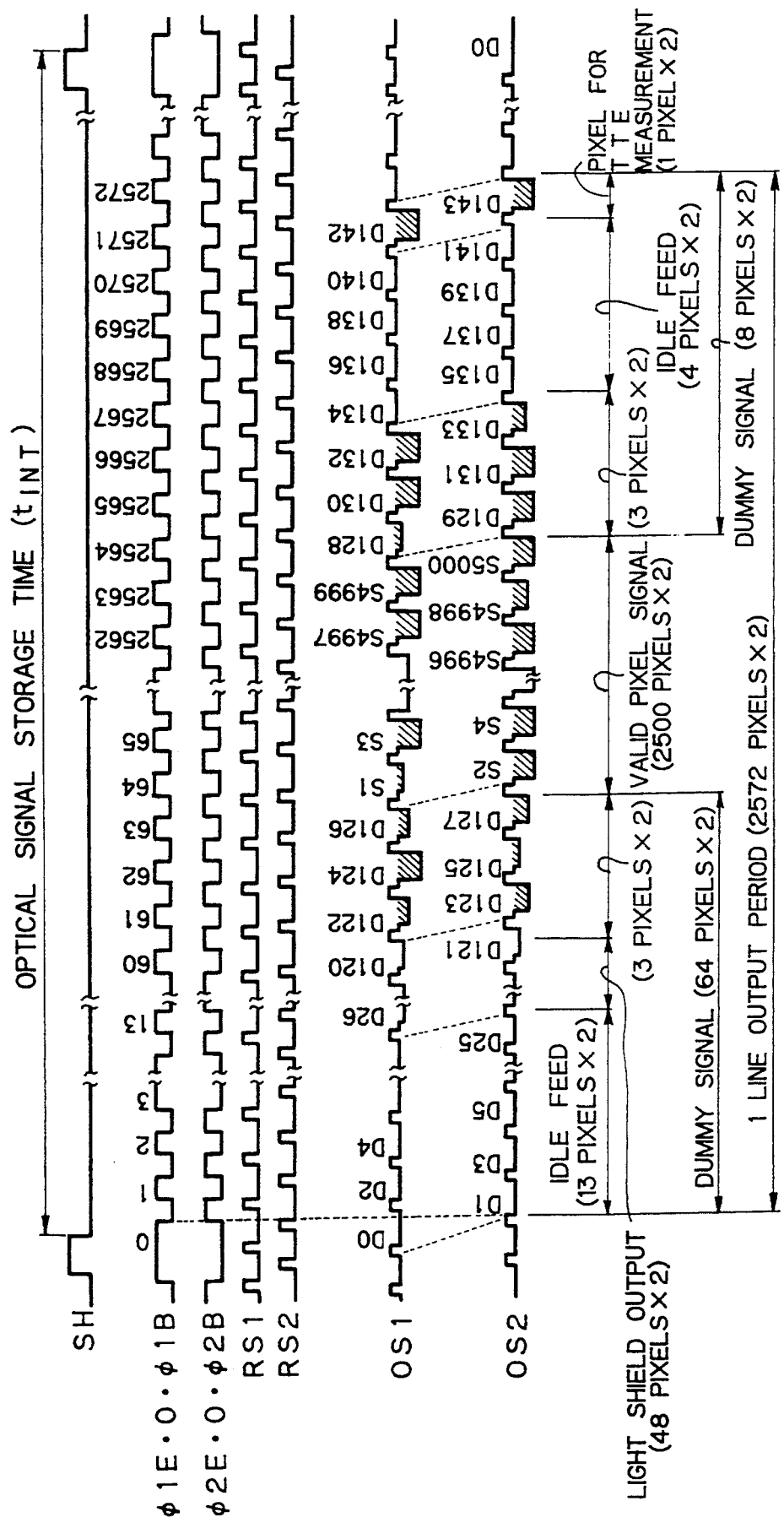
FIG. 18 is a timing chart representative of the output signals of a CCD image sensor included in the conventional image scanner.
Figure 19:
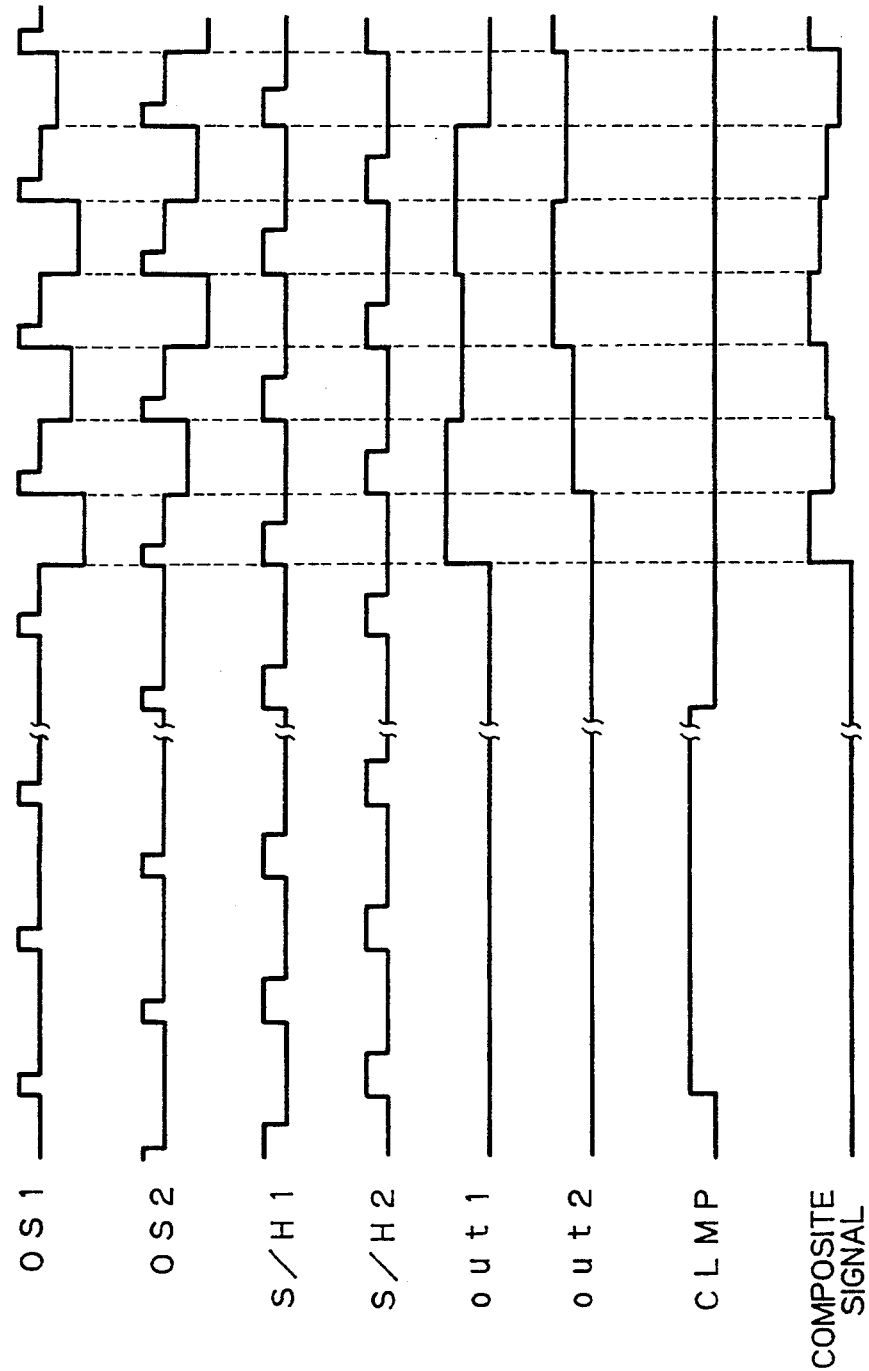
FIG. 19 is a timing chart representative of a relation between the output signals of the CCD image sensor of FIG. 17 and the other signals.

To better understand the present invention, a brief reference will be made to a conventional image scanner, shown in FIG. 17. As shown, the scanner is generally made up of a CCD circuit (SBU) 20 for reading a document optically, and a signal processing circuit (VPU) 30. The two circuits 20 and 30 are each mounted on respective circuit board. The CCD circuit 20 includes a CCD image sensor 20 which generates analog output signals OS1 (odd order image signal) and OS2 (even order image signal). The signals OS1 and OS2, which are relatively low, are respectively amplified by amplifiers 21a and 21b, and amplifiers 31a and 31b which are included in the signal processing circuit 30. As shown in FIG. 18, the signals OS1 and OS2 are different in phase by 180 degrees from each other. Specifically, in the CCD image sensor 9 having two channel outputs, the clock frequency is one half of the pixel frequency; the signals OS1 and OS2 are combined by a multiplexer 38, which will be described, to double the frequency. The amplified image signals OS1 and OS2 are respectively clamped by clamp circuits 32a and 32b and then applied to sample and hold circuits 33a and 33b and sample and hold circuits 34a and 34b. Signals S/H1 and S/H2, FIG. 19, are applied to the sample and hold circuits 33a and 33b, respectively. The sample and hold circuits 33a and 33b each samples the image signal when the associated signal S/H1 or S/H2 is in a high level and holds it when the signal S/H1 or S/H2 is in a low level. In FIG. 19, the outputs of the sample and hold circuits are represented by OUT1 and OUT2, respectively.

The image signals from the sample and hold circuits 34a and 34b are again amplified by amplifiers 35a and 35b and amplifies 36a and 36b, respectively. Clamp circuits 37a and 37b clamp respectively the outputs of the amplifiers 36a and 36b such that the portion of the CCD image sensor 9 which shields the photosensor with aluminum, i.e., a light shield is fixed at zero volt. Specifically, since the outputs of the CCD image sensor 9 are DC superposed and, therefore, coupled by capacitors C1 and C2, the absolute zero volt has to be determined. Clamp signals applied to the clamp circuits 37a and 37b are labeled CLMP in FIG. 19.

The multiplexer (MPX) 38 selects the odd order and even order image signals alternately to produce a composite 1-channel signal, as shown in FIG. 19. This signal is sequentially amplified by amplifiers 39 and 40, clamped by a clamp circuit 41, and then transformed to a digital image signal by an analog-to-digital converter (ADC) 42. The digital image signal is capable of rendering a single pixel in several tones. The digital image signal is routed through an interface, not shown, to an image processing device, image recording device or similar device. A timing signal generator, not shown, generates timing signals and delivers them to the CCD circuit 20 and signal processing circuit 30 via amplifiers 44 and 45, respectively. A controller, not shown, feeds control signals to the CCD circuit 20 and signal processing circuit 30 via an amplifier 46.

The conventional scanner described above has the following problem left unsolved. When the output of the signal processing circuit 30 is faulty, which of the circuits 20 and 30 is faulty cannot be determined easily and rapidly, i.e., they have to be tested one by one, consuming a substantial period of time, as discussed earlier.

Figure 1:
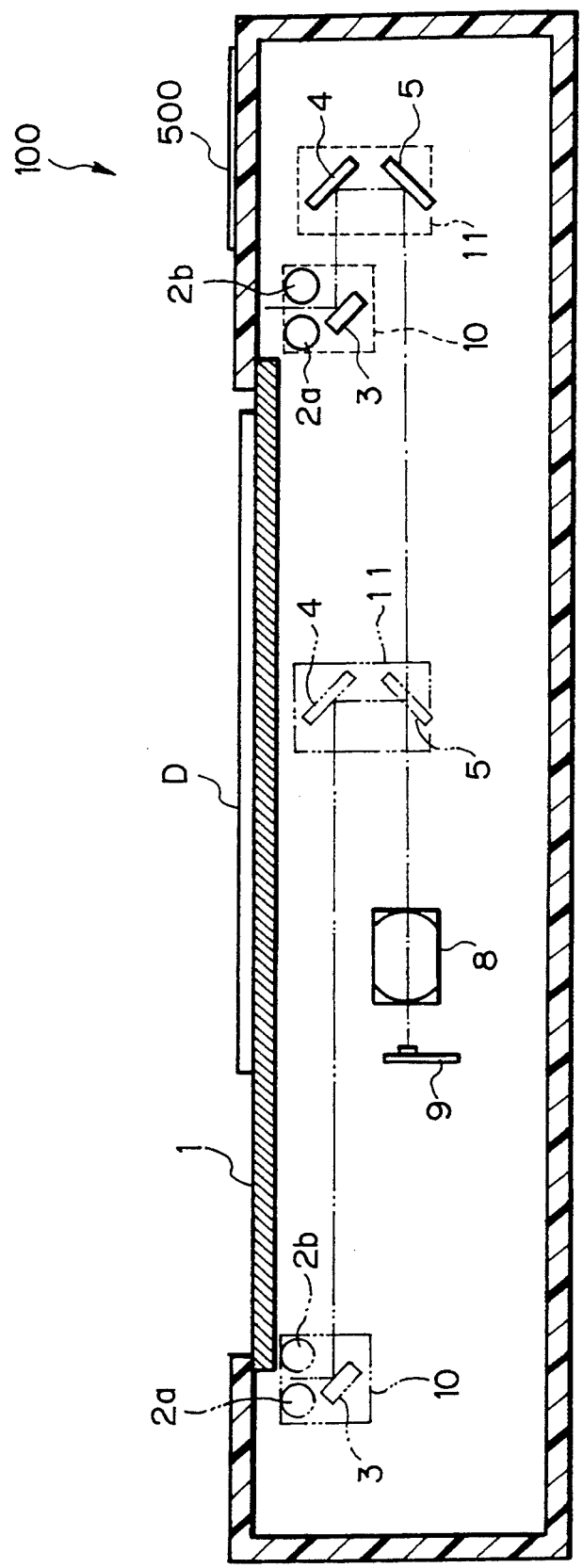
FIG. 1 is a side elevation of an image scanner embodying the present invention.

Referring to FIG. 1, an image scanner embodying the present invention is shown and generally designated by the reference numeral 100. As shown, the scanner 100 has a glass platen 1 to be loaded with a document. As light sources 2a and 2b illuminate the document via the glass platen 1, the resulting imagewise reflection from the document is focused onto the photosensitive surface of the CCD image sensor 9 via mirrors 3, 4 and 5 and a lens 8. The light sources 2a and 2b and mirror 3 are mounted on a carriage 10 which is movable in parallel to the glass platen 1 in the subscanning direction (perpendicular to the array of the image sensor 9). The mirrors 4 and 5 are mounted on another carriage 11 movable in the subscanning direction in association with and at half the speed of the carriage 10. As these carriages 10 and 11 are moved, the document is scanned in the subscanning direction. Regarding the main scanning direction (parallel to the array of the image sensor 9), the document is scanned by the solid-state scanning of the image sensor 9. As a result, the document is read by the image sensor 9 bidimensionally. An operation and display board 500 is mounted on the front top of the scanner 100.

Figure 2A:
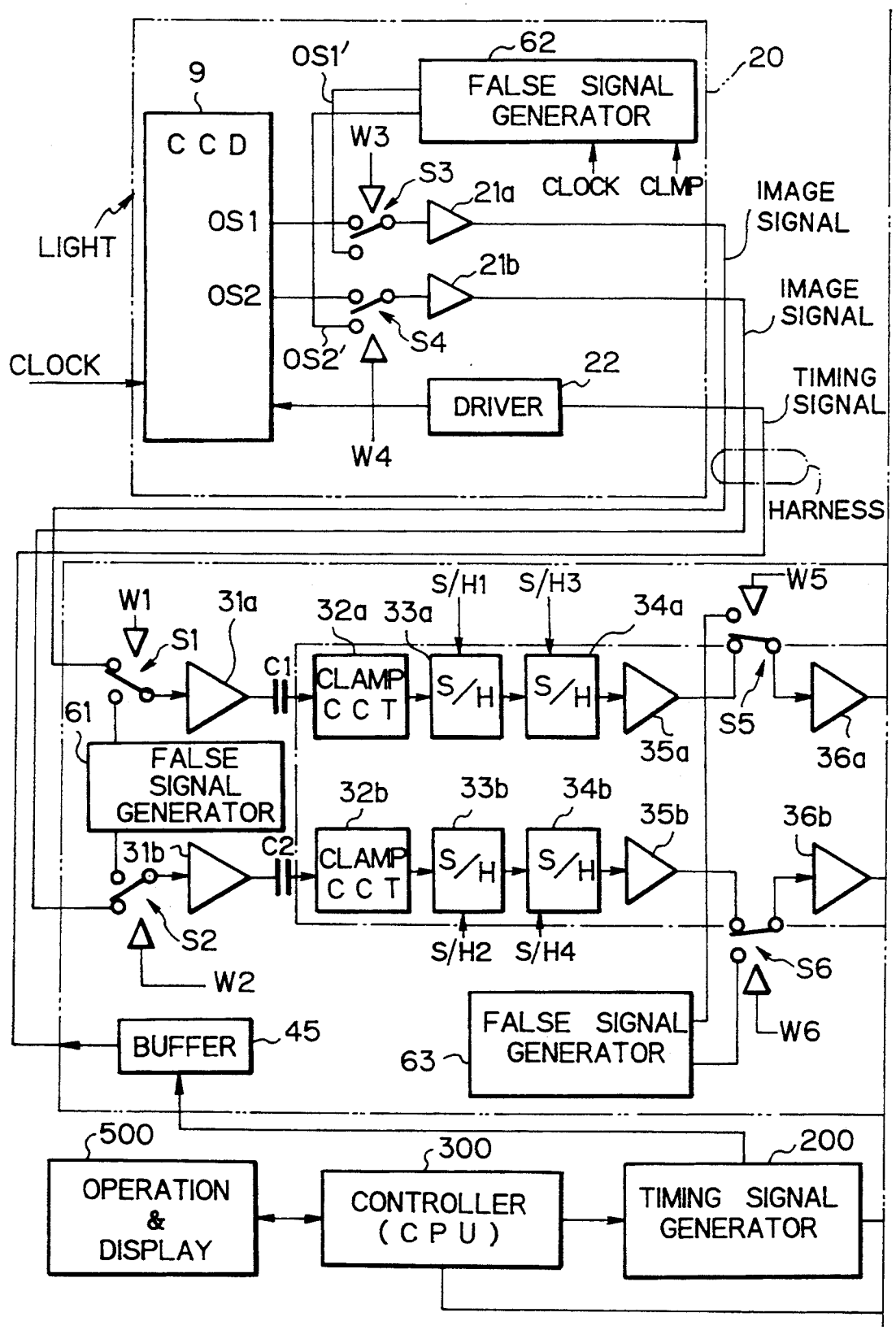
FIG. 2 is a block diagram schematically showing electric circuitry incorporated in the embodiment.
Figure 2B:
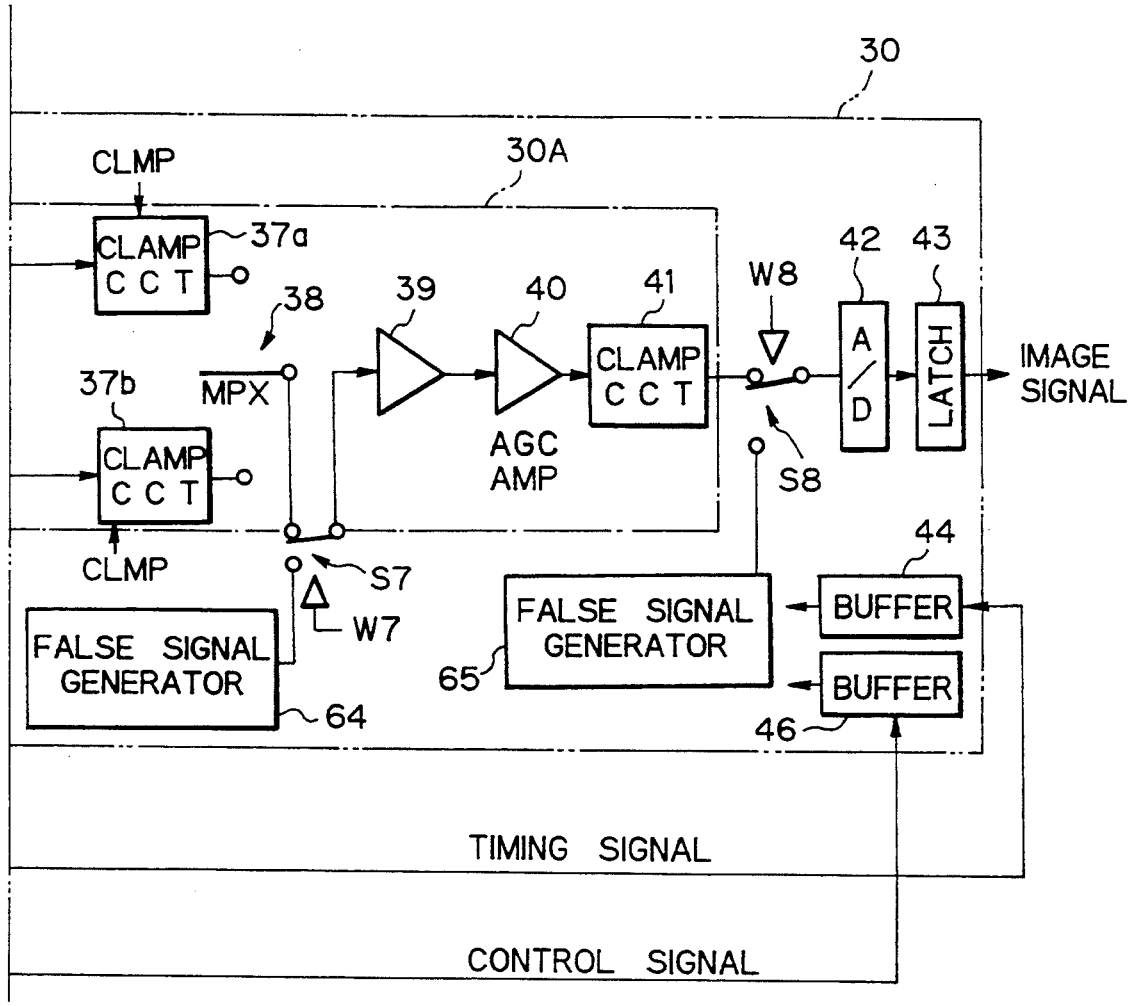

FIG. 2 shows electric circuitry incorporated in the scanner 100. In FIG. 2, the same constituents as the constituents of the conventional scanner, FIG. 17, are designated by the same reference numerals, and a detailed description thereof will not be made in order to avoid redundancy. As shown, the CCD circuit 20 and signal processing circuit 30 have false signal generators 61-65 for generating false signals or test signals, and switches W1-W8 for replacing the image signals output from the CCD image sensor 9 with the false signals. A timing signal generator 200 generates switching signals W1-W8 under the control of a controller (CPU) 300. The switching signals W1-W8 are selected on keys provided on the operation and display board 500 which is connected to the controller 300.

Figure 3:
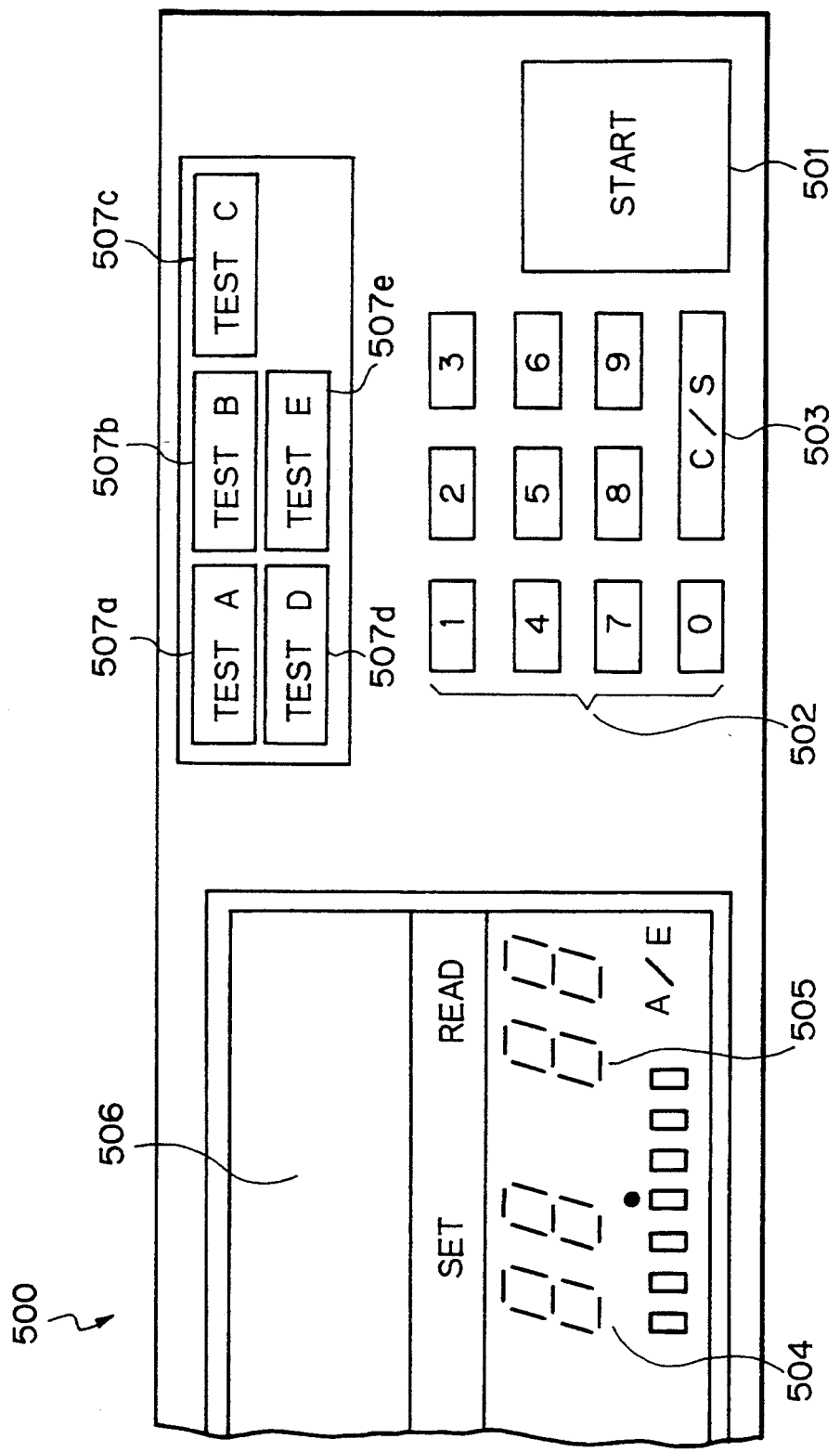
FIG. 3 is a fragmentary enlarged plan view of an operation and display panel included in the embodiment.

FIG. 3 is a view showing a part of the operation and display board 500 specifically. There are shown in the figure a scan start key 501 for entering a start command, numeral keys 502 for entering various numerical values including the number of documents to read, a clear/stop key 503 for selectively clearing the number of documents to read or interrupting a reading operation under way, 8- segment displays 504 and 505 respectively assigned to the number of documents to read and the number of documents read, a panel 506 for displaying the state of the scanner 100 an d other information, and test switches 507a-507e accessible for entering a test command particular to the illustrative embodiment. The test switches 507a-507e are usually operated by a serviceman; test pattern processing is executed on the operation of one of such switches. When one of the test switches 507a-507e pressed is pressed again, the test pattern processing is cancelled and replaced with an ordinary mode (condition shown in FIG. 2). Whether or not an error has occurred, the location of the error and the state of the error as determined by the test pattern processing are displayed on the panel 506. Alternatively, the scanner 100 may be connected to an image recorder to print out the result of test patter processing. Although a density key, magnification key and other conventional keys, as well as conventional indicators, are also arranged on the board 500, they are not shown or described specifically.

Referring again to FIG. 2, assume that the switch 507a, FIG. 3, provided on the operation and display board 500 is pressed. Then, the timing signal generator 200 generates switching signals W1 and W2 with the result that the switches S1 and S2 are connected to the output terminals the false signal generator 61. The false signal generator 61 delivers a false signal for a test pattern to each of the amplifiers 31a and 31b. In this condition, the CCD circuit 20 and the signal processing circuit 30 are tested individually. When the switch 507b is pressed, the timing signal generator 200 feeds switching signals W3 and W4 to the switches S3 and S4, respectively. As a result, the switches S3 and S4 are connected to the output terminals of the false signal generator 62. Hence, a false signal for a test pattern is fed from the false signal generator 62 to the amplifiers 21a and 21b. This allows the CCD image sensor 9 and the circuit following it, which includes a harness, to be tested individually.

When the switch 507c is pressed, the timing signal generator 200 delivers switching signals W5 and W6 to connect the switches S5 and S6 to the output terminals of the false signal generator 63. Consequently, a false signal for a test pattern is fed from the false signal generator 63 to the amplifiers 36a and 36b. In this condition, the signal processing circuit 30 has a part thereof preceding the amplifiers 36a and 36b and the other part following them tested independently of each other. When the switch 507d is pressed, the timing signal generator 200 delivers a switching signal W7 to the switch S7 to connect it to the output terminal of the false signal generator 64. As a result, a false signal for a test pattern is fed from the false signal generator 64 to the amplifier 39, testing a part of the signal processing circuit 30 preceding the amplifier 39 and the other part following it independently. Further, when the switch 507e is pressed, the timing signal generator 200 delivers a switching signal W8 to the switch W8 to connect it to the output terminal of the false signal generator 65. In this condition, a false signal for a test pattern is fed from the false signal generator 65 to the ADC 42. Consequently, a part of the signal processing circuit 30 preceding the ADC 42 and the other part following it are tested individually.

For example, when the scanner fails, the switch 507e associated with the downstream side of the signal path and then the switches 507d, 507c, . . . , 507a may be sequentially pressed in this order until an error indication appears on the display panel 506. This allows the operator to see the location of the CCD circuit 20 or that of the signal processing circuit 30 where an error has occurred.

Figure 4A:
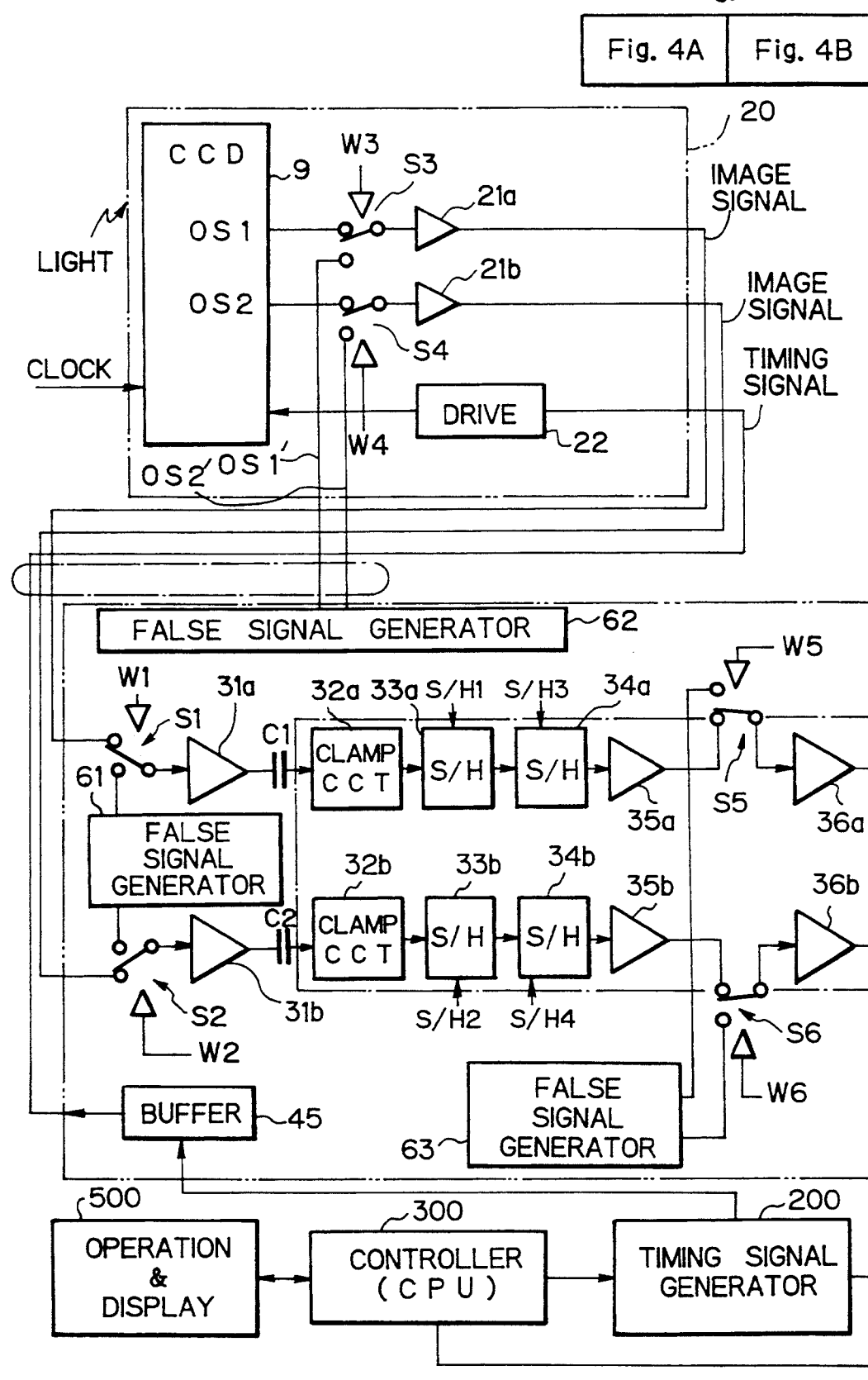
FIG. 4 is a block diagram schematically showing a modified form of the electric circuitry.
Figure 4B:
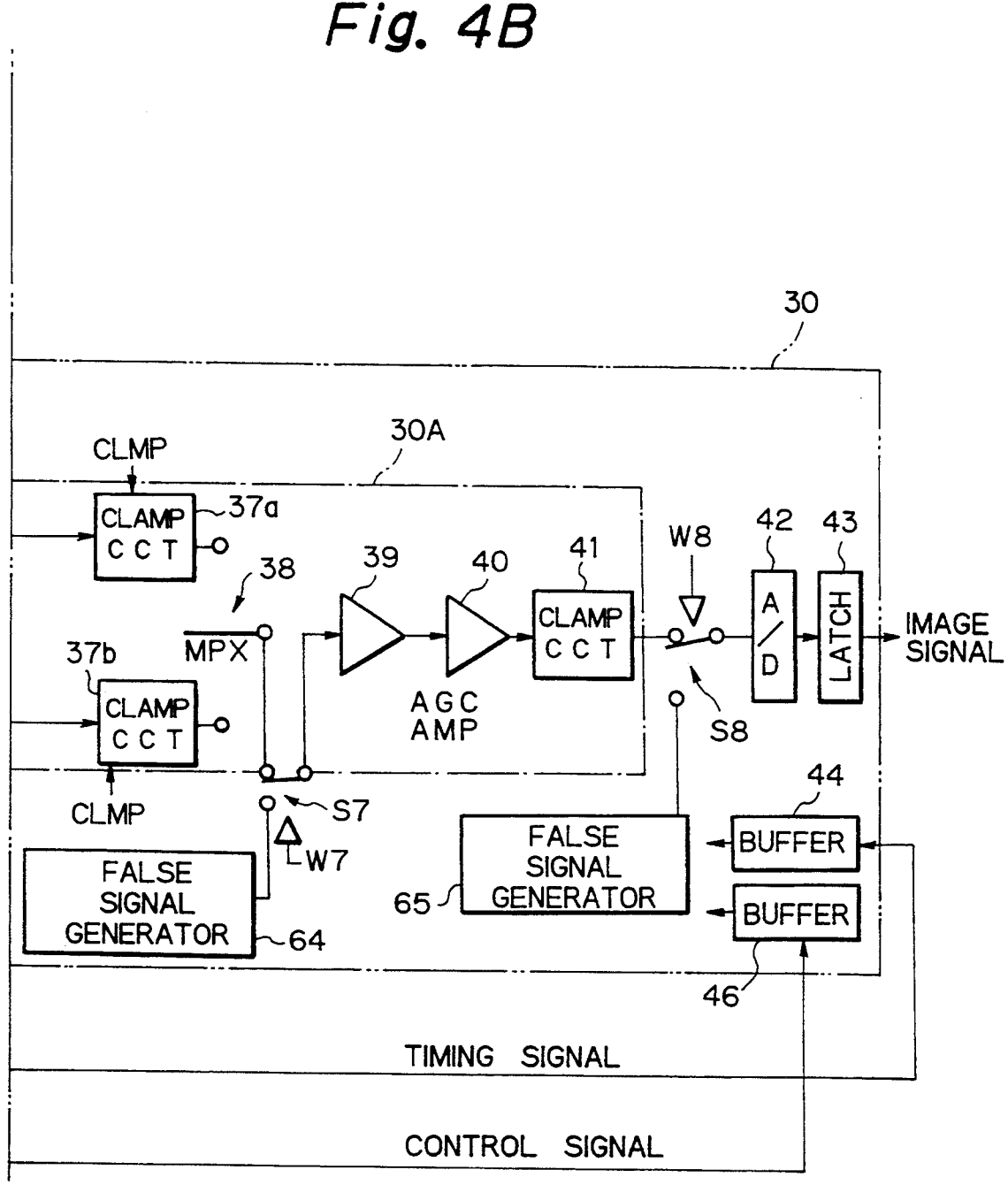

Alternatively, as shown in FIG. 4, only the false signal generator 62 may be built in the signal processing circuit 30 via a harness. This will provide the CCD circuit 20 with an additional area.

Figure 5:
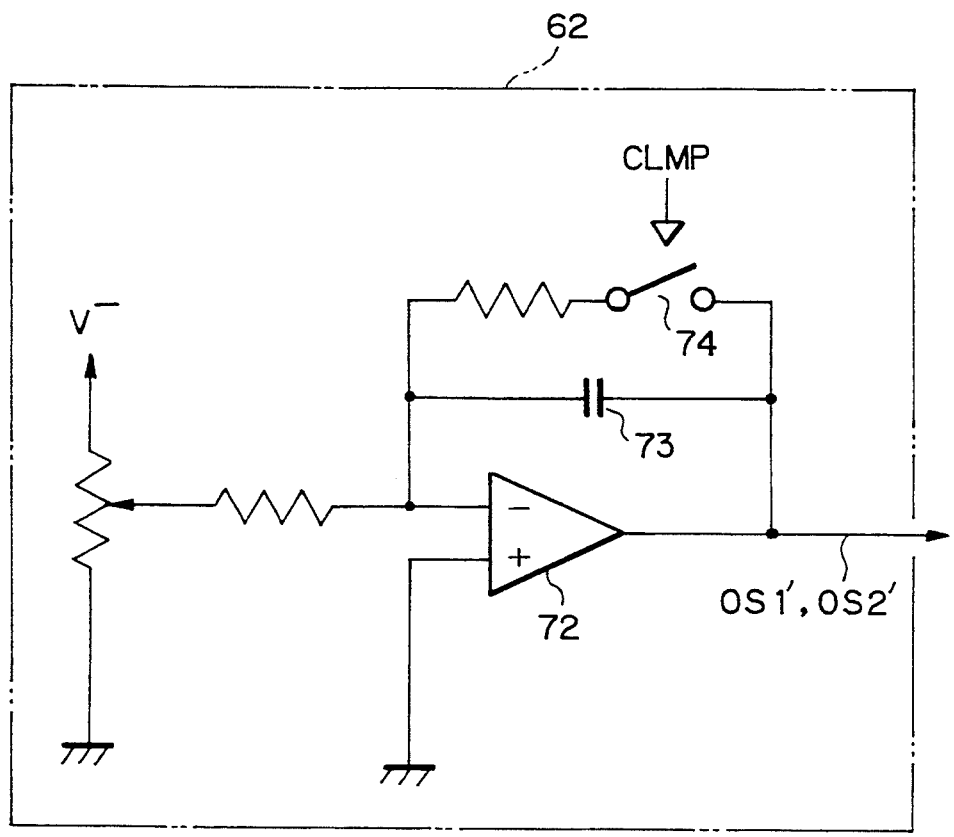
FIG. 5 is a block diagram schematically showing a specific construction of a false signal generator shown in FIG. 2.
Figure 6A:
FIG. 6A shows the waveform of a false signal generated by the false signal generator of FIG. 5.
Figure 6B:
FIG. 6B shows the waveform of a clamp signal.

FIG. 5 shows a specific construction of the false signal generator 62 while FIG. 6A shows identical false signals OS1' and OS2' to be generated thereby. As shown, the false signal generator 62 has a capacitor 73 for integration. Since the capacitor 73 integrates a DC voltage, the output of the false signal generator 62 is amplified monotonously. However, a switch 74 is closed on the arrival of a clamp signal CLMP, FIG. 6B, resetting the output signal. As a result, the false signals OS1' and OS2' each having a saw-toothed waveform, as shown in FIG. 6A, are input to the signal processing circuit 30, allowing the linearity of the circuit 30 to be evaluated.

Figure 7:
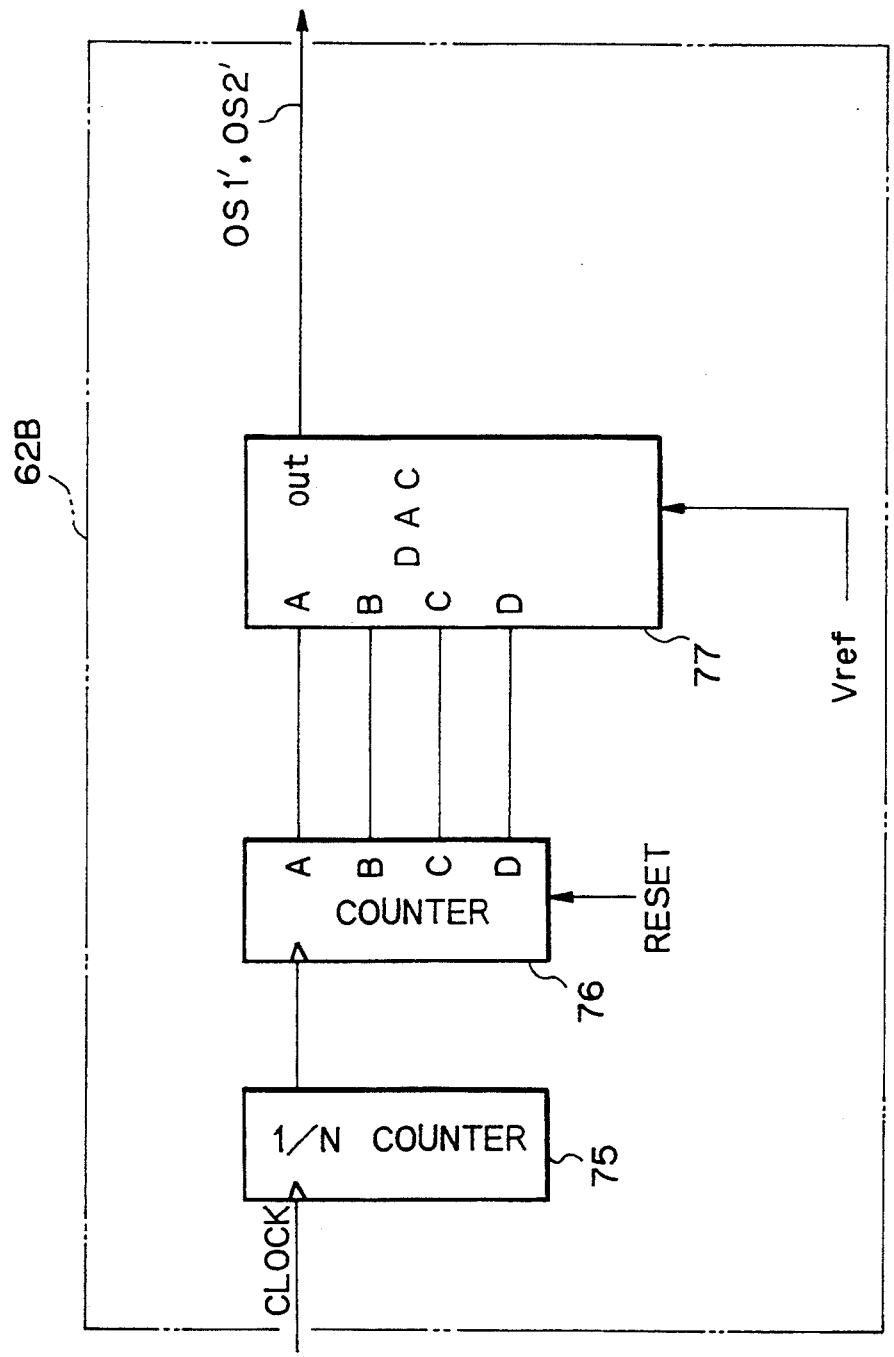
FIG. 7 is a block diagram schematically showing another specific construction of the false signal generator.

Another specific construction of the false signal generator 62 is shown in FIG. 7. As shown, the false signal generator, generally 62B, is made up of a counter 75 for 1/n frequency division, a counter 76 having binary outputs, and a digital-to-analog converter (DAC) 77. FIG. 8A shows false signals OS1' and OS2' to be output from the false signal generator 62B and each having fiat portions in several steps. These signals OS1' and OS2' are applied to the signal processing circuit 30, so that the S/N ratio (scattering) of the circuit 30 can be evaluated. Providing the signals OS1' and OS2' with several steps, as shown in FIG. 8A, makes it possible to evaluate the S/N ratios of the consecutive levels at the same time. For example, assume that a single main scanning has a period corresponding to 5000 clock pulses, and that the 1/n frequency dividing counter 75 divides the input clock by 500. Then, the counter 76 is reset by "10", causing the DAC 77 to produce an output having ten steps of equal interval. When the signals OS1' and OS2' are implemented as steps of equal interval, the S/N ratio and the linearity can be evaluated at the same time. FIG. 8B shows the waveform of the clamp signal CLMP.

Figure 9:
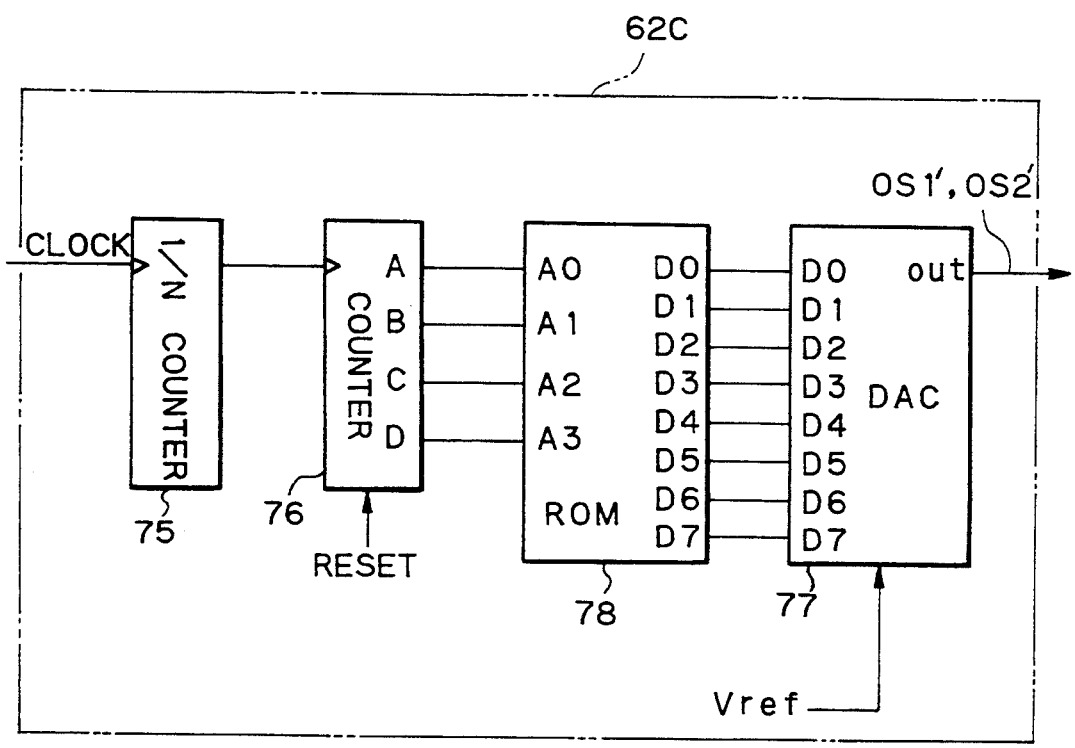
FIG. 9 is a block diagram schematically showing still another specific construction of the false signal generator.
Figure 10:
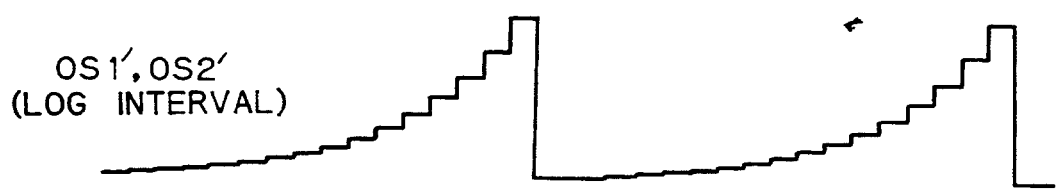
FIG. 10 shows the waveform of a false signal generated by the false signal generator of FIG. 9.

Still another specific construction of the false signal generator 62 is shown in FIG. 9. As shown, the false signal generator, generally 62C, has an 8-bit ROM 78 having addresses A0-A3 and connected between the counter 76 and the DAC 77 of FIG. 7. When any one of addresses 0-15 is applied to the ROM 78, corresponding one of digital density linear values shown in FIG. 11 is read out of the ROM 78 and fed to the DAC 77. Specifically, false signals OS1' and OS2' each having steps of logarithmic interval are input to the signal processing circuit 30, setting up a density linear condition. This promotes easy evaluation when the scanner is connected to an image recorder to produce a reproduction for evaluation. In a reflection linear condition shown in FIG. 11, digital values are generated such that all the addresses 0-15 are equal in reflectance interval; in the density linear condition, reflectances are represented by logarithmic values and then converted to digital values to render density linear.

Figure 12:
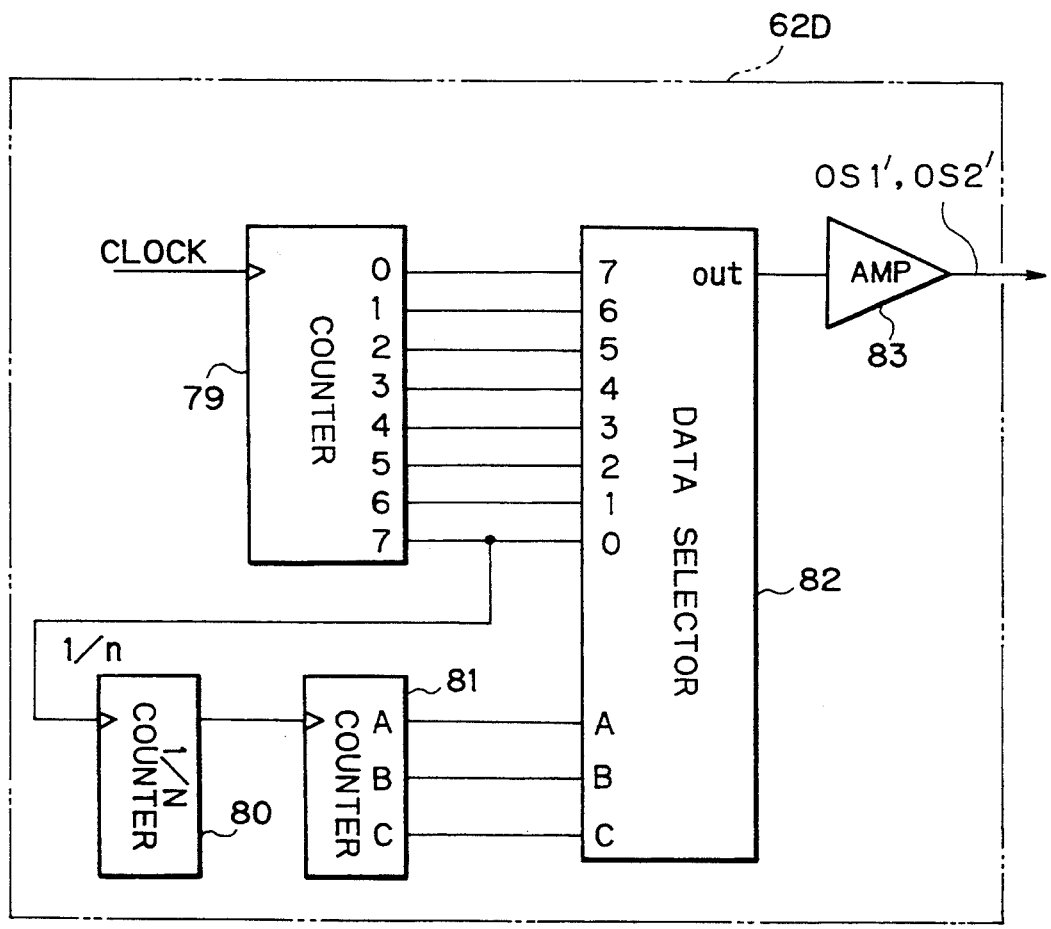
FIG. 12 is a block diagram schematically showing a further specific construction of the false signal generator.
Figure 13A:
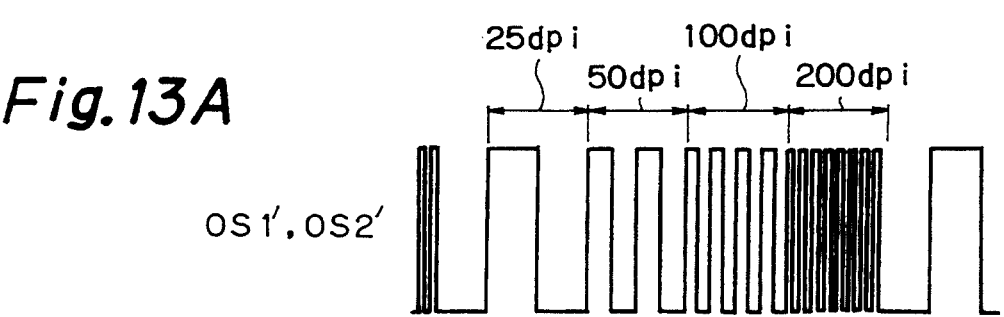
FIG. 13A shows the waveform of a false signal generated by the false signal generator of FIG. 12.
Figure 13B:
FIG. 13B shows the waveform of a clamp signal.

A further specific construction of the false signal generator 62 is shown in FIG. 12. As shown, the false signal generator, generally 62D, has a counter 79 having binary outputs, a counter 80 for 1/n frequency division, an octonary counter 81, a data selector 82, and an amplifier 83. The counter 79 produces signals 0-7 whose frequency sequentially increase in double. The data selector 82 selects one of the output signals of the counter 79. FIG. 13A shows the resulting false signals OS1' and OS2' in which rectangular portions each having a particular period appear together in a single main scanning. Hence, by changing the period of a signal having a rectangular waveform and feeding it to the signal processing circuit 30, it is possible to evaluate the frequency response of the circuit 30. Specifically, the MTF of the circuit can be evaluated.

Further, the false signals OS1' and OS2' may each be implemented as the combination of a linearly increasing signal and any desired rectangular wave, a shown in FIG. 14A. By applying such signals to the signal processing circuit 30 repetitively, it is possible to evaluate both the linearity and the MTF at the same time. This kind of waveform can be generated if the waveforms shown in FIGS. 6A and 13A are combined.

Figure 15C:
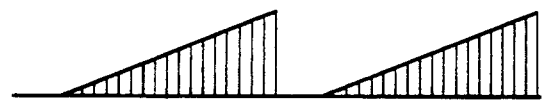
FIG. 15C shows the output waveform of an amplifier included in the embodiment and to appear when the false signals shown in FIGS. 15A and 15B are applied to the amplifier.

FIGS. 15A–15C show other specific waveforms of the false signals OS1' and OS2'. As shown, a false signal OS1' having a saw-toothed waveform (FIG. 15A) is applied as an odd order input, and then a zero-volt false signal OS2' (FIG. 15B) is applied as an even order input, or vice versa. By providing each of the odd order and even order signals with a particular waveform, it is possible to generate a signal in which zero and maximum level appear alternately pixel by pixel. Hence, the characteristics of the amplifiers 39 and 40 which follow the multiplexer 38 can be evaluated under severer conditions. FIG. 15C shows the waveform of the output of the amplifier 40.

As shown in FIGS. 16A–16D, the false signal OS1' (FIG. 16A) and the false signal OS2' (FIG. 16B) may each be provided with a waveform which once falls to the zero level at each pixel, as the output waveform of a CCD image sensor does. Then, the amplifiers 21a and 21b located at the initial stage can have their characteristics evaluated under severer conditions.

In summary, it will be seen that the present invention provides an image scanner having image reading means and image signal processing means and allows a person to see which of the two means has failed easily and rapidly. Hence, in the event of a failure, the scanner can be repaired rapidly. Since false signal generating means does not have to be built in the image reading means, the image reading means has a sufficient area which is desirable for circuit design. In addition, functions incorporated in the image signal processing means can be tested in a specific manner.

Various modifications will become possible for those skilled in the art after receiving the teachings of the present disclosure without departing from the scope thereof.

What is claimed is:

1. An image scanner comprising:

image reading means for reading an image optically to thereby generate an odd order and an even order analog image signal representative of said image; and image signal processing means for converting said odd order and even order analog image signals to digital image signals;

said image signal processing means comprising:

first amplifiers for amplifying respectively said odd order and even order analog image imagenals;

sample and hold circuits for sampling and holding respectively image signal portions of said odd order and even order analog image signals amplified by said amplifiers;

clamp circuits for clamping respectively black dummy portions of said odd order and even order analog image signals sampled and held by said sample and hold circuits;

a multiplexer for multiplexing said odd order and even order analog image signals clamped by said clamp circuits;

a second amplifier for amplifying an output of said multiplexer;

an analog-to-digital converter for transforming said output of said multiplexer amplified by said second amplifier to a digital image signal;

a false signal generator for generating a false reference signal;

an input circuit for inputting a test command; and signal switching means located on a signal path extending from said image reading means to said analog-to-digital converter for delivering, when a test command is entered on said input circuit, said false reference signal to a part of said signal path downstream of said signal switching means or delivering, when said test command is not entered, a signal appearing on said signal path upstream of said signal switching means to said signal path downstream of said signal switching means.

2. An image scanner as claimed in claim 1, wherein said signal switching means is connected between said image reading means and said first amplifiers.

3. An image scanner as claimed in claim 1, wherein said signal switching means is connected between said sample and hold circuits and said analog-to-digital converter.

* * * * *